(12) United States Patent
Sheppard et al.

(10) Patent No.: US 7,617,782 B2
(45) Date of Patent: Nov. 17, 2009

(54) SEED AND FERTILIZER PLACEMENT APPARATUS HAVING DOUBLE SHOOT SEED BOOT

(75) Inventors: Clint W. Sheppard, Yorkton (CA); John A. Lesanko, Sturgis (CA); Barry B. Barsi, Yorkton (CA)

(73) Assignee: Morris Industries Ltd., Saskatoon, Saskatchewan, CA (US)

( * ) Notice: Subject to any disclaimer, the term of this patent is extended or adjusted under 35 U.S.C. 154(b) by 0 days.

(21) Appl. No.: 12/166,542

(22) Filed: Jul. 2, 2008

(65) Prior Publication Data

US 2009/0013910 A1 Jan. 15, 2009

Related U.S. Application Data

(60) Provisional application No. 60/949,445, filed on Jul. 12, 2007.

(51) Int. Cl.
 *A01B 49/04* (2006.01)
 *A01C 5/00* (2006.01)
 *A01C 13/00* (2006.01)

(52) U.S. Cl. .................. 111/135; 111/73; 111/156; 111/927

(58) Field of Classification Search .......... 111/135, 111/139, 73, 74, 123, 120, 118, 200, 156, 111/927; 172/684.5, 705, 710, 734, 763, 172/643, 484, 500, 462; 137/595
See application file for complete search history.

(56) References Cited

U.S. PATENT DOCUMENTS

| 5,331,907 | A | 7/1994 | Beaujot |
| 5,351,635 | A | 10/1994 | Hulicsko |
| 5,396,851 | A | 3/1995 | Beaujot |
| 6,182,587 | B1 | 2/2001 | Lempriere |
| 6,302,040 | B2 | 10/2001 | Lempriere |
| 6,325,156 | B1 | 12/2001 | Barry |
| 6,408,772 | B1 | 6/2002 | Lempriere |
| 6,955,131 | B2 | 10/2005 | Beaujot et al. |
| 7,261,048 | B1 | 8/2007 | Hantke |
| 2006/0162632 | A1 | 7/2006 | Bourgault et al. |

FOREIGN PATENT DOCUMENTS

CA 2509564 12/2005

*Primary Examiner*—Christopher J. Novosad
(74) *Attorney, Agent, or Firm*—Hovey Williams LLP

(57) ABSTRACT

A double shoot seed and fertilizer placement unit has a leading shank that cuts a fertilizer trench in the soil, a seed shovel immediately behind but above the lower extremity of the shank to cut one or more seed shelves in the soil above and outboard of the fertilizer trench, a boot behind the shovel that places seeds on the shelf and then drops fertilizer into the fertilizer trench between and below the seeds, and a fertilizer guide member that rides in the fertilizer trench below the fertilizer outlet to maintain the integrity of the trench in preparation for the fertilizer and helps guide the fertilizer down to the bottom of the trench as it emanates from the boot.

11 Claims, 9 Drawing Sheets

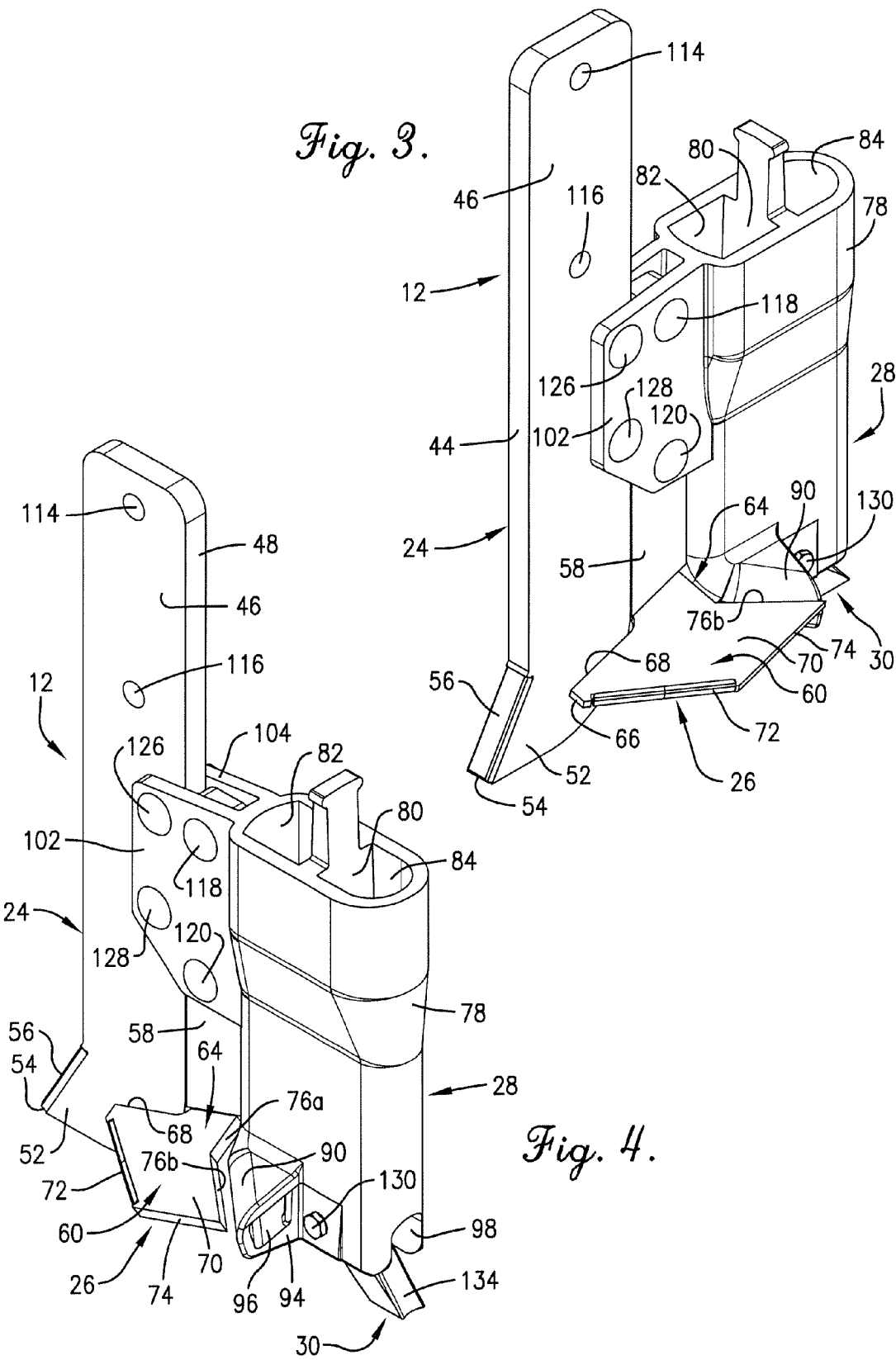

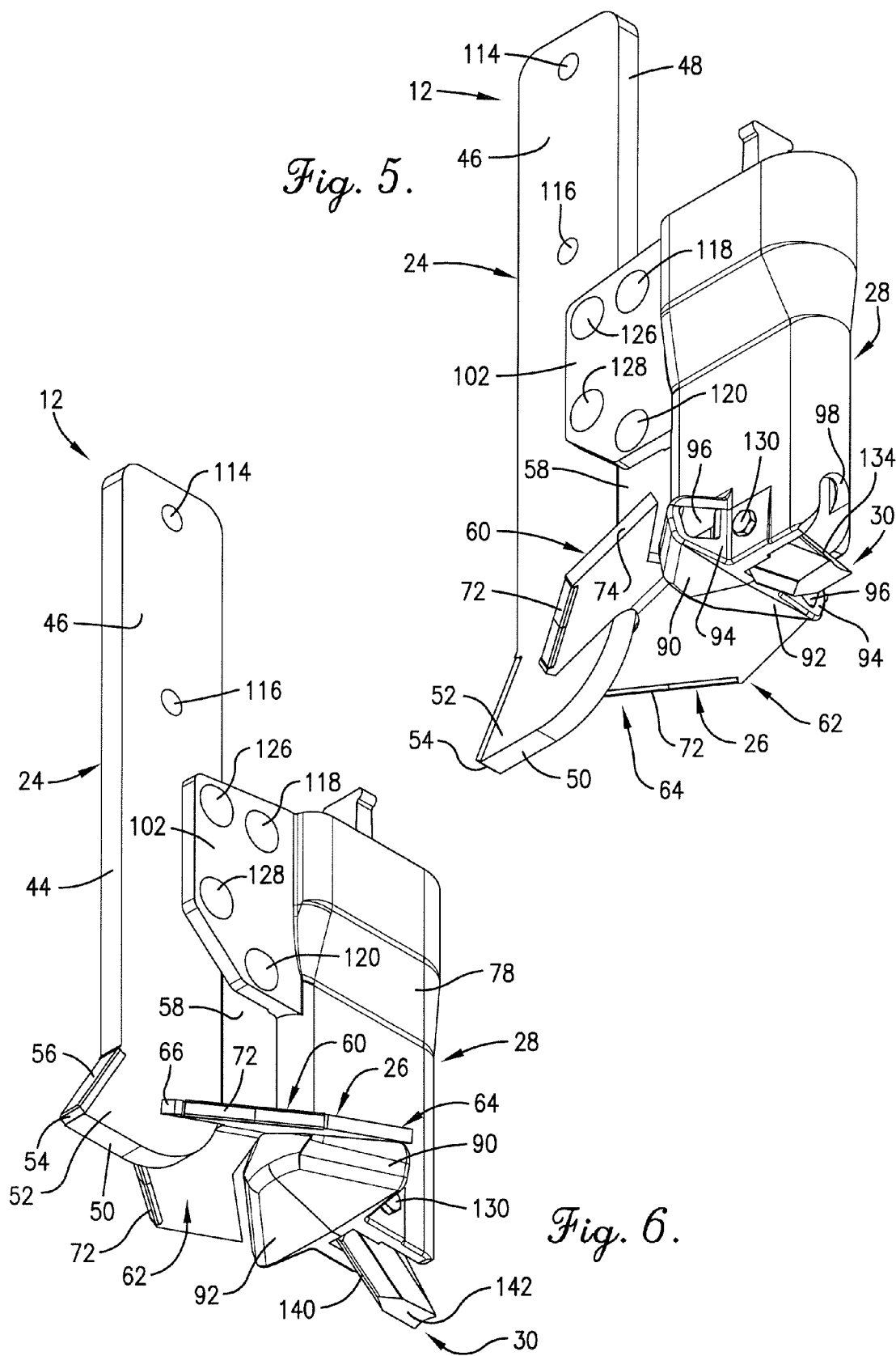

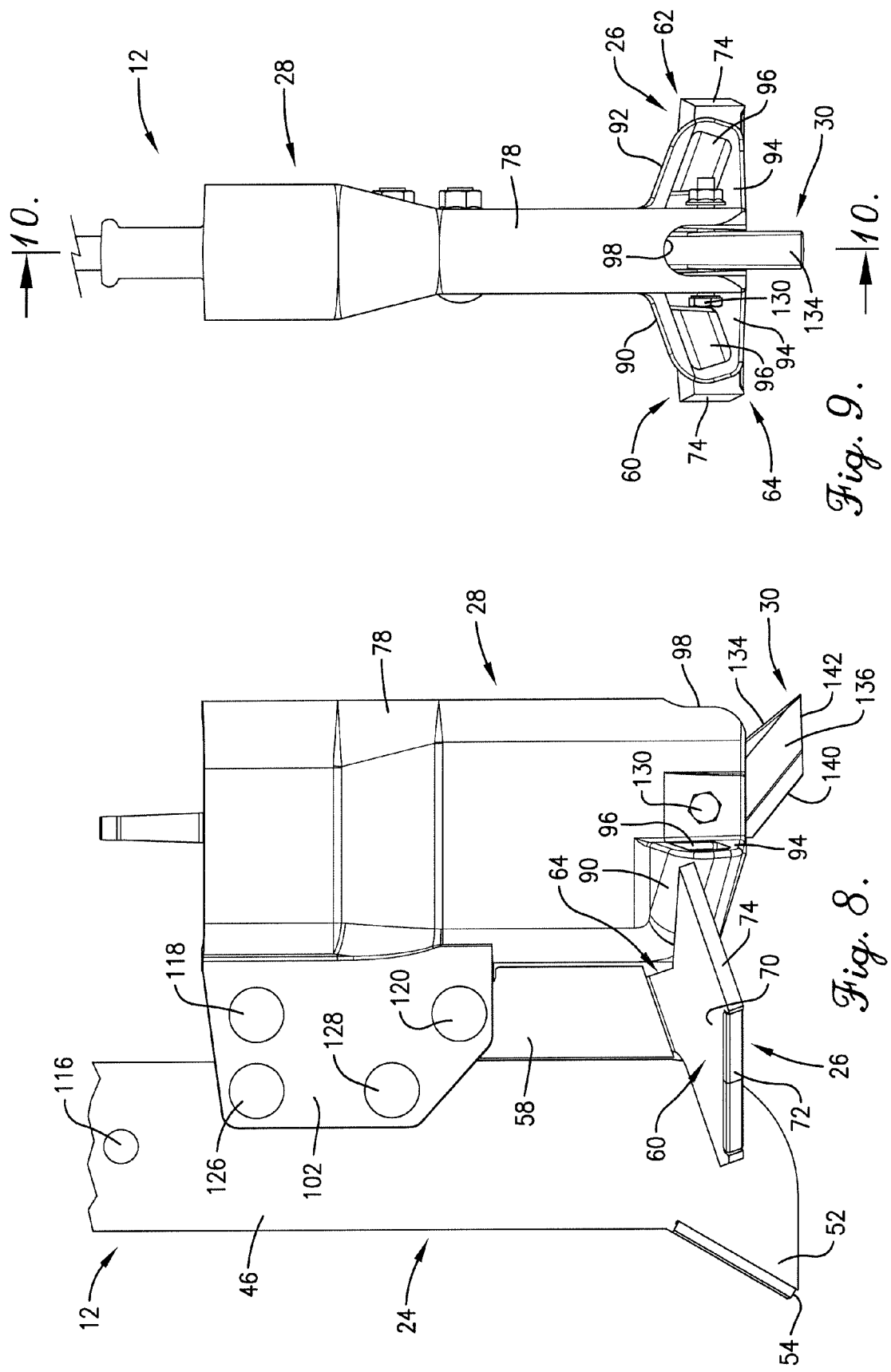

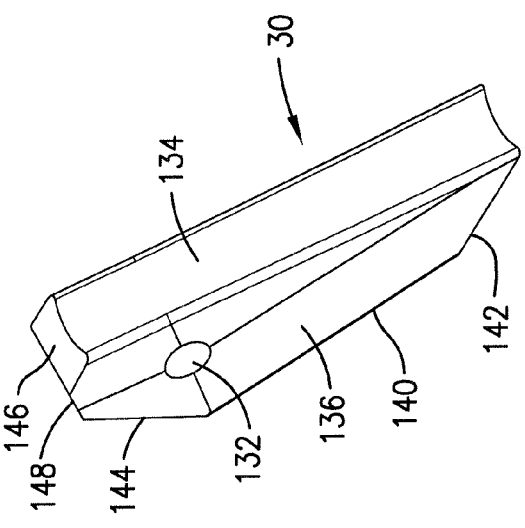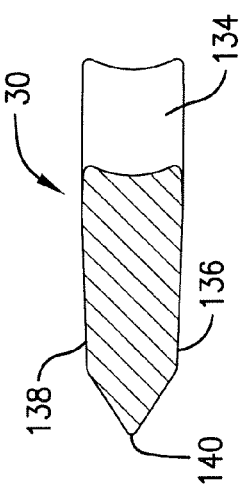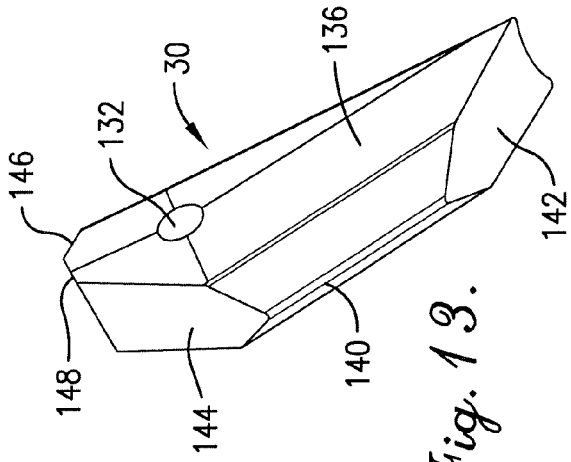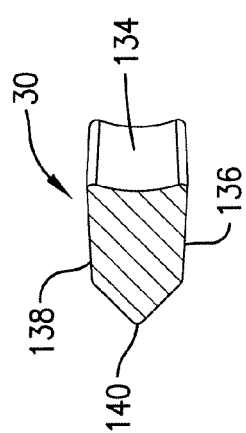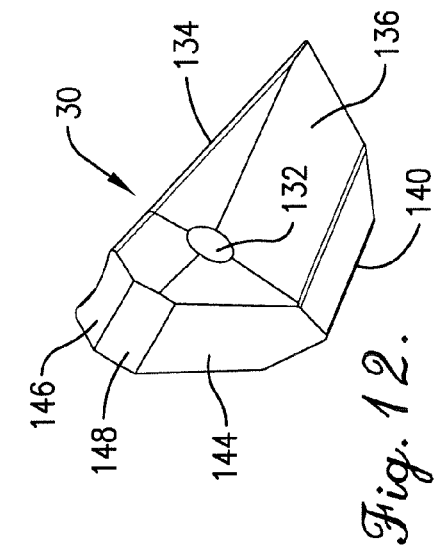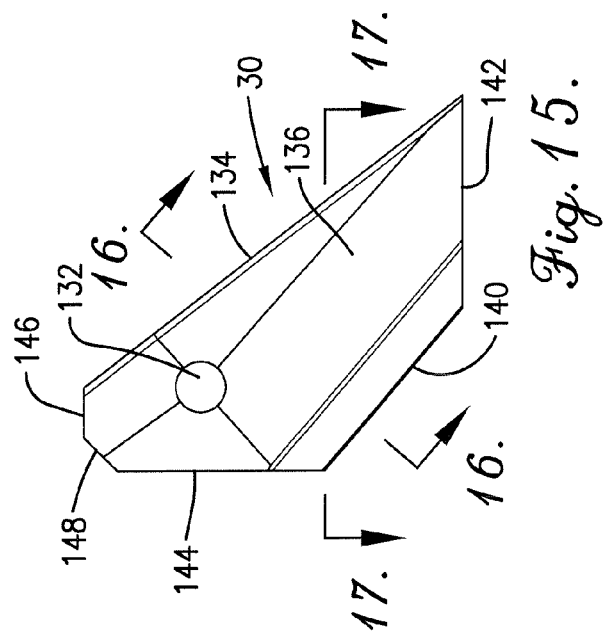

SEED AND FERTILIZER PLACEMENT APPARATUS HAVING DOUBLE SHOOT SEED BOOT

RELATED APPLICATION

This application is related to and claims the priority benefit of prior co-pending U.S. Provisional Application No. 60/949,445, filed Jul. 12, 2007, said Provisional Application being hereby incorporated by reference into the present specification.

TECHNICAL FIELD

The present invention relates to the field of farm implements and, more particularly, to so-called "double shoot" devices that simultaneously place both seed and starter fertilizer in the ground during the same pass.

BACKGROUND AND SUMMARY

Agricultural machinery applications are being driven towards higher levels of cost efficiency and risk management due to narrower profit margins and higher input costs (seed, fertilizer, chemical etc.). For this reason, it is desirable for today's farmer to be able to plant seed and also apply appropriate amounts of fertilizer and plant nutrients all in a single-pass seeding operation. In this way, there is less fuel consumed (single seeding operation with no prior fertilizer applications necessary) and less wear on machinery and equipment.

However, in order to do this, there are risks that have to be managed. Mainly, the farmer must be careful not to apply too much fertilizer with the seed in order to avoid "seed burn" or fertilizer toxicity, which can reduce the seedling population due to seedling mortality. This occurs when the concentration of fertilizer (usually containing a combination of nitrogen, phosphorus, potassium, and sulphur) is too high near the seed which can poison the seed and prevent germination and growth. Farmers also need to avoid under-fertilizing and losing valuable production capability due to lack of available nutrients for growing plants.

To manage the risks of fertilizer toxicity in single-pass seeding operations, there have traditionally been two methods used. One method involves using two separate application devices, one for seed and one for fertilizer, mounted on the same implement frame. These devices can consist of a shank or disk style opener to apply the seed, and another set of shank or disk-style openers to apply the fertilizer. This method generally allows seed to be placed in one set of rows and then fertilizer to be placed in alternating rows between the seed rows.

The disadvantages of this type of system are threefold: There is added cost to add a set of separate fertilizer openers to the seeder; there are added power requirements to pull both seed and fertilizer openers; and because the fertilizer application is generally in the center between seed rows, some immobile nutrients (an example being sulphur) may be stranded up to 6" away from the seed rows.

The other common method of single-pass seeding is to use a "double shoot boot" system wherein seed and fertilizer are applied through different outlets through the same seed boot. A common concern with this system is having a lack of proper seed-to-fertilizer separation due to variations in the final resting place of the seed and fertilizer as they come out of the double shoot boot. Seeds can bounce away from their intended positions and end up in contact with the fertilizer and vice versa. Also, due to their complexity, many double shoot boots are easily plugged with soil or trash in wet seeding conditions, which can lead to skips in the field (no seed is planted).

The present invention provides an improvement over past double shoot boot systems because it achieves consistent seed placement and seed-to-fertilizer separation. Current double shoot boot systems achieve a spread of seed across the whole disturbed area, instead of defined seed rows. This can result in seed being mixed in with fertilizer, and poor germination will occur. Seed germination will also be negatively affected if the seed is deposited on fractured soil, which is another common problem with current double shoot boots in the marketplace. With the present invention, seed is trapped on a firm, laterally disposed shelf spaced above and to the side of fertilizer deposited down into a centrally disposed, deeper trench. In a preferred embodiment, a pair of seed shelves are provided on opposite sides of the central fertilizer trench. Other improvements include good resistance to plugging in wet seeding conditions and, unlike some other double shoot boot systems, good ground penetration ability in firm soil (due to its narrow profile).

BRIEF DESCRIPTION OF THE DRAWINGS

FIG. 3 is a left front isometric view of the double shoot placement unit removed from the row unit;

FIG. 4 is a left rear isometric view of the placement unit;

FIG. 5 is a left, rear, bottom isometric view of the placement unit;

FIG. 6 is a left, front, bottom view of the placement unit;

FIG. 8 is an enlarged, fragmentary, left side elevational view of the placement unit;

FIG. 9 is a rear elevational view of the placement unit;

FIG. 12 is a left, front isometric view of the wedge-shaped fertilizer guide member at the rear of the placement unit;

FIG. 13 is a left, front, bottom isometric view thereof;

FIG. 14 is a left rear isometric view thereof;

FIG. 15 is a left side elevational view thereof;

FIG. 16 is a transverse cross-sectional view through the guide member taken substantially along line 16-16 of FIG. 15;

FIG. 17 is a transverse cross-sectional view of the guide member taken substantially along line 17-17 of FIG. 15;

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
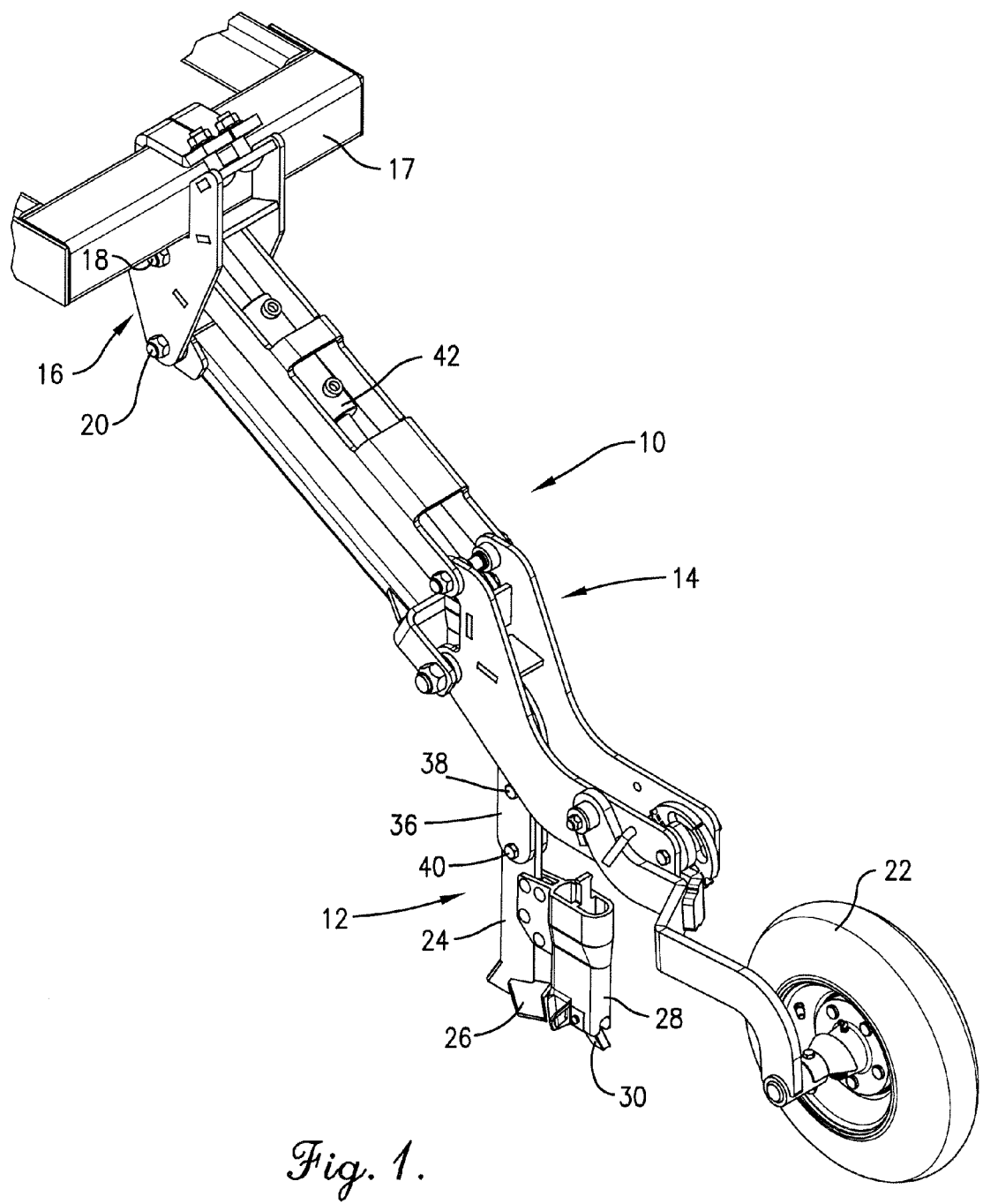
FIG. 1 is a fragmentary left rear isometric view of an exemplary opener or row unit having a double shoot seed/fertilizer placement unit in accordance with the principles of the present invention.
Figure 2:
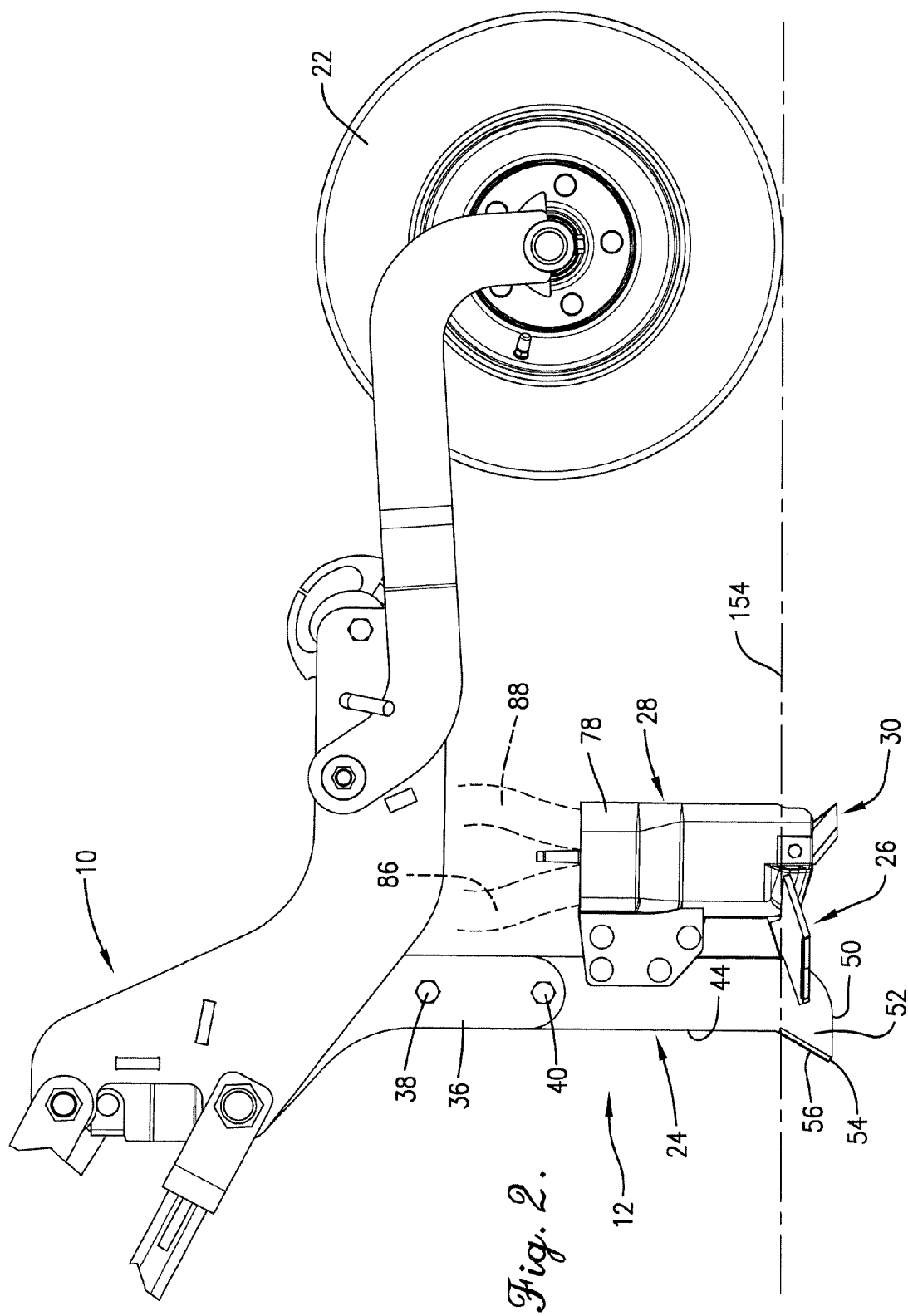
FIG. 2 is an enlarged, fragmentary side elevational view thereof.

The exemplary opener 10 illustrated in FIGS. 1 and 2 includes a double shoot seed and fertilizer placement unit 12 in accordance with the present invention mounted on and carried by a carrier assembly 14 that may take a variety of different forms. In addition to placement unit 12 and carrier assembly 14, opener 10 also includes a mounting bracket 16 at the upper forward end of carrier assembly 14 that secures the latter to a tool bar 17 associated with and forming a part of a frame of a larger implement. It will be understood that, typically, opener 10 is one of a plurality of such openers associated with the implement.

In the illustrated embodiment, carrier assembly 14 is adapted to swing up and down about horizontal pivots 18 and 20 at bracket 16 so that opener 10 can follow the contours of the ground independently of the other openers associated with the machine. A trailing gauge wheel 22 determines the depth of penetration of placement unit 12 and makes opener 10 responsive to changes in ground contour as wheel 22 rides along the ground during operations. In one preferred embodiment, carrier assembly 14 may take the form of corresponding apparatus disclosed and claimed in published patent application document 2008/0093093 filed Oct. 22, 2007 and titled Combination Hydraulic Hold-Down and Lift System for an Agricultural Implement. The '093 publication document is hereby incorporated by reference in its entirety into the present specification as a disclosure of carrier assembly 14 and its relationship to a ground engaging tool such as placement unit 12.

Figure 7:
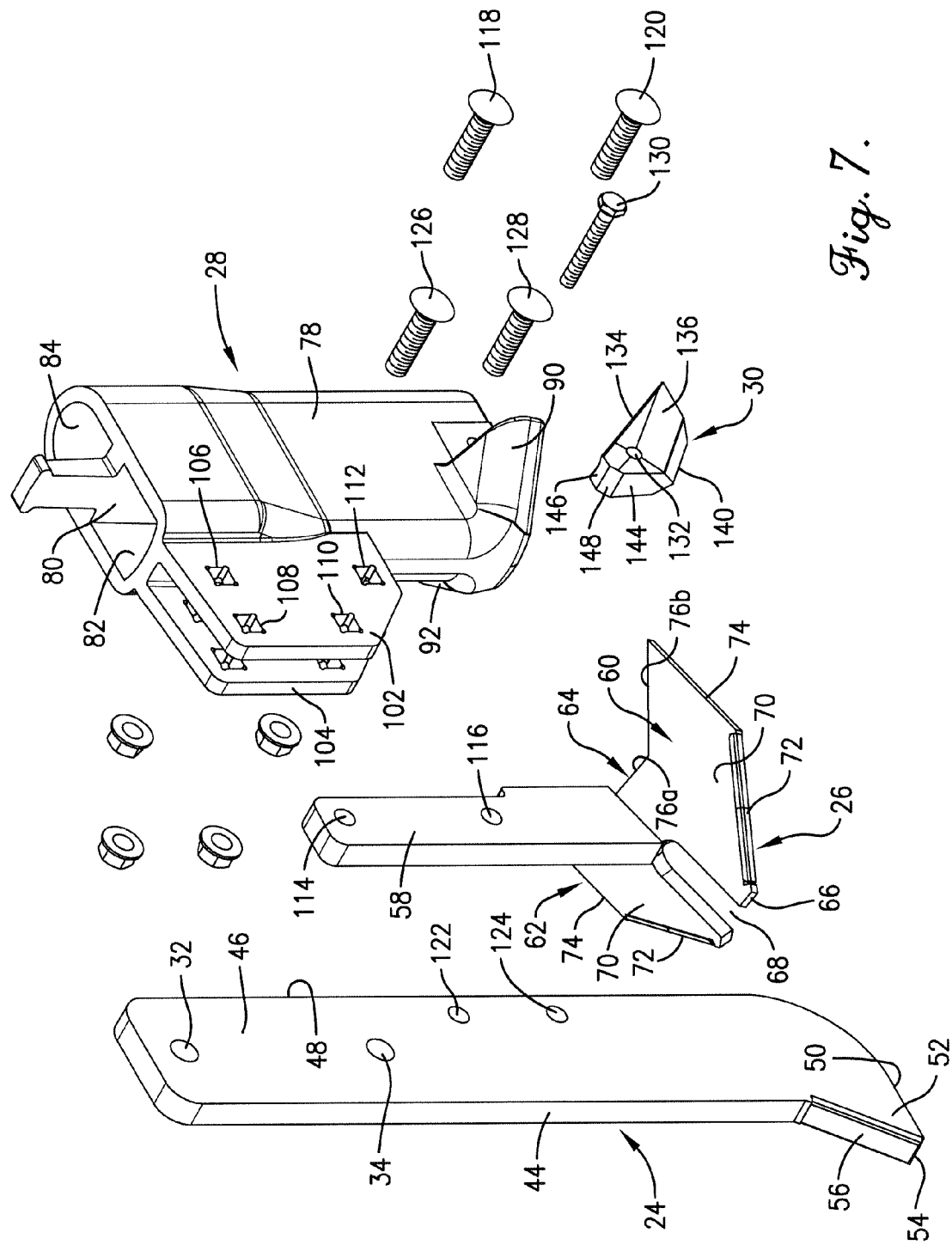
FIG. 7 is a left, front, exploded isometric view of the placement unit.

Referring initially to FIG. 7, the placement unit 12 comprises four major components, i.e., an opener shank 24, a seed shovel 26, a seed and fertilizer boot 28, and a fertilizer guide member 30. All four of these components are bolted together into a rigid assembly to form the working unit 12. Details of the manner of securing the components to one another will hereinafter be described in more detail.

Shank 24 is an elongated, upright, relatively thin flat metal shank having a pair of mounting holes 32 and 34 adjacent its upper end that adapt shank 24 for attachment to a mounting member 36 of carrier assembly 14. Bolts 38 and 40 pass through holes 32, 34 in shank 24 and attach the latter to member 36. Member 36 is controlled by a hydraulic cylinder 42 of carrier assembly 14 in accordance with the principles set forth in the incorporated '093 patent application publication document.

Shank 24 has an upright, flat leading edge 44, a pair of flat, opposite sides 46 (only the left side being visible in the drawings), a trailing edge 48, and a bottom edge 50. Trailing edge 48 curves forwardly at the lower end of shank 24 to merge with the bottom edge 50, and shank 24 is configured to provide a forwardly projecting nose 52 at its lowermost end that terminates in a tip 54 at the intersection of leading edge 44 and bottom edge 50. A hardened wear plate 56 or the like may be provided along leading edge 44 in the vicinity of nose 52 to resist premature wear on shank 24 as it moves through the soil. The purpose of shank 24 is to cut through the soil as placement unit 12 is moved forwardly and to prepare a fertilizer trench 24a (FIG. 11a) generally corresponding in width and configuration to shank 24.

Seed shovel 26 includes an upright, flat mounting member 58 and a pair of left and right wings 60, 62 respectively that are preferably integrally joined as part of a common wing unit 64. Wings 60, 62 are secured to the bottom extremity of mounting member 58 and project laterally outwardly therefrom in opposite left and right directions. While a pair of such wings 60, 62 is preferred, it is within the scope of the present invention to have only one of such wings such that only a single seed shelf is prepared on one side of fertilizer trench 24a, rather than two.

The wing unit 64 is so positioned relative to mounting member 58 that a major portion of wing unit 64 projects forwardly beyond member 58 and terminates in a truncated apex 66. A notch 68 in wing unit 64 extends rearwardly from apex 66 to the front extremity of mounting member 58 and is slightly wider than shank 24 so that, when placement unit 12 is fully assembled, the rear edge 48 of shank 24 slips into notch 68 and wings 60, 62 embrace opposite sides thereof.

Referring also to FIGS. 18-21, it will be seen that wing unit 64 is formed in such a manner that wings 60, 62 diverge downwardly and outwardly away from a central, generally flat attaching section 69 to which the bottom edge of mounting member 58 is welded or otherwise affixed. However, the bottom edge of mounting member 58 is cut on a bias such that, when wing unit 64 is secured thereto, section 69 slopes upwardly and rearwardly relative to the upright longitudinal axis of mounting member 58 and wing unit 64 slopes generally upwardly and rearwardly in the same manner. As a result, wings 60, 62 are slightly upwardly and rearwardly inclined while at the same time being slightly outwardly and downwardly inclined, presenting flat, top surfaces 70 that are both upwardly and rearwardly inclined and outwardly and downwardly inclined.

Wing unit 24 is generally delta-shaped so as to present a pair of laterally outwardly and rearwardly diverging forward edges 72, one for each wing 60, 62. Despite the angular orientation of wing member 64 relative to mounting member 58, the downturned, mutually diverging nature of wings 60, 62 is such that forward edges 72 extend essentially horizontally outwardly from opposite sides 46 of shank 24. They are also spaced a significant distance above the bottom edge 50 and tip 54 of shank 24. Forward edges 72 may be hardened if desired.

Figure 11:
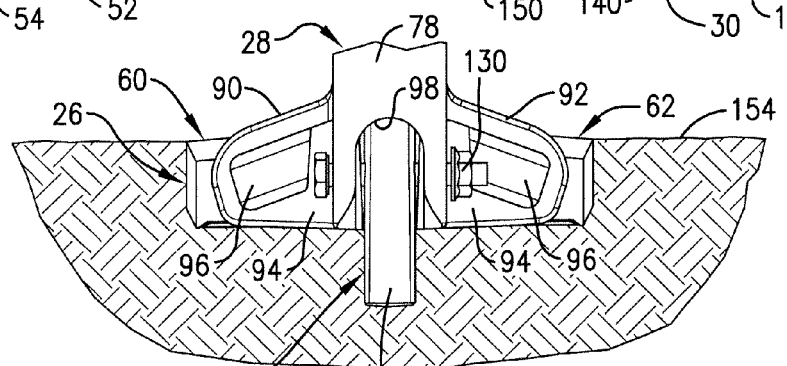
FIG. 11 is a fragmentary rear elevational view of the placement unit as it moves through the soil.
Figure 11A:
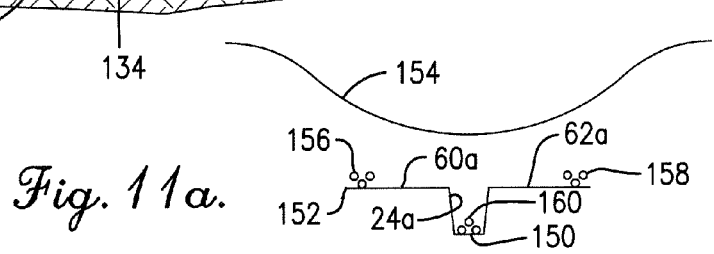
FIG. 11a is a schematic representation of soil conditions following deposit of seeds and fertilizer by the placement unit.
Figure 18:
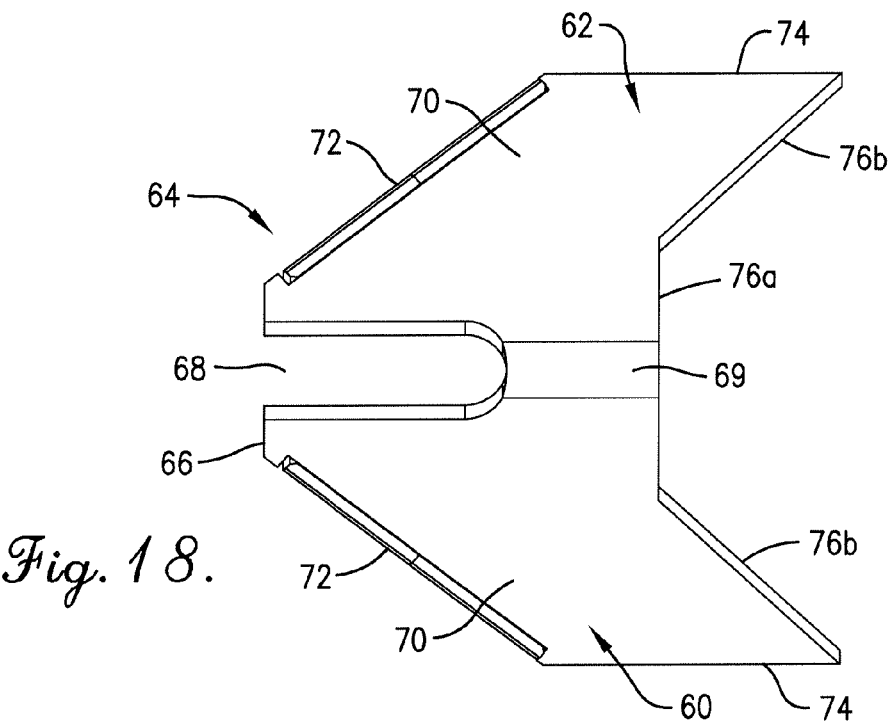
FIG. 18 is a top plan view of the wing unit of the seed shovel of the placement unit.
Figure 19:
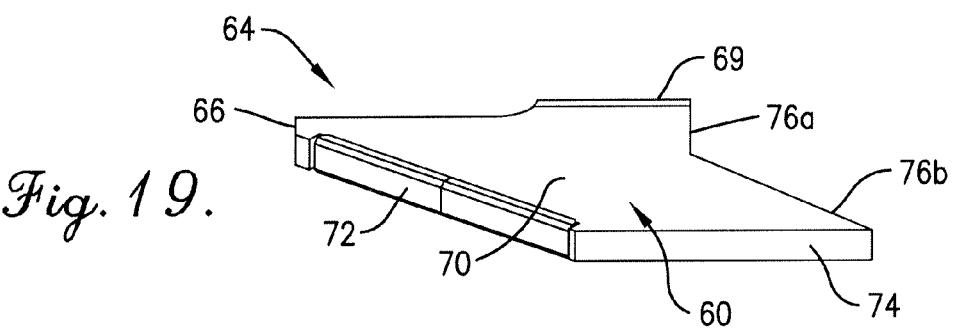
FIG. 19 is a left side elevational view of the wing unit.
Figure 20:
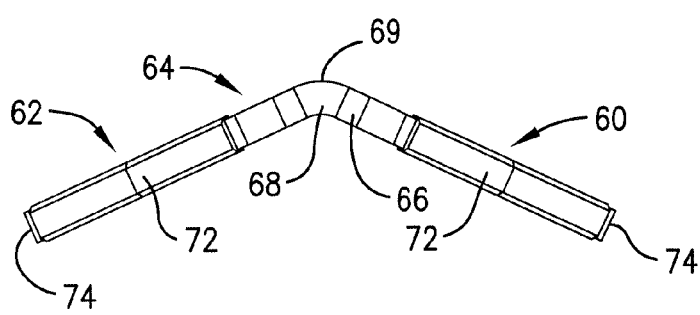
FIG. 20 is a front elevational view of the wing unit.
Figure 21:
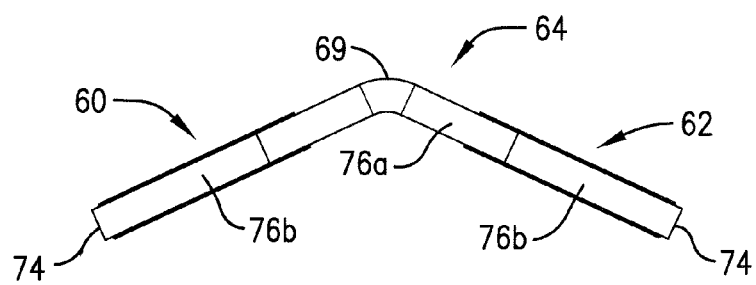
FIG. 21 is a rear elevational view of the wing unit.

Each wing 60, 62 also has a fore-and-aft extending, laterally outer edge 74 that extends in parallel relationship with the corresponding side of mounting member 58 and shank 24. Outer edges 74 commence at the laterally outermost termination of forward edges 72 and extend rearwardly in mutually parallel relationship to the rear extremity of wing unit 64 where they intersect with a rear edge across the back of wing unit 64. The rear edge extends across the rear of wing unit 64 and has a central, generally arched stretch 76a that extends normal to the outer edges 74 and a pair of outwardly and rearwardly angled stretches 76b that lead from central stretch 76a to the outer edges 74. Stretches 76b are substantially parallel with the forward edges 72. The purpose of wings 60, 62, and specifically forward edges 72, is to provide a pair of shelves 60a and 62a in the soil above and outboard of fertilizer trench 24a as illustrated in FIG. 11a so that seeds can be received upon such shelves.

Boot 28 comprises an upright hollow body 78 having a generally transversely elliptical configuration. The hollow interior of body 78 is subdivided by an upright internal wall 80 into a front, upright seed passage 82 and a rear upright fertilizer passage 84. As shown in FIG. 2, seed passage 82 is adapted to be supplied with seeds by a seed supply conduit 86, while fertilizer passage 84 is adapted to be supplied with dry fertilizer via a fertilizer supply conduit 88. Conduits 86 and 88 communicate with central sources of seed supply and fertilizer supply on the machine (not shown).

Body 78 has a pair of left and right, wing-like protrusions 90 and 92 respectively that project laterally outwardly from opposite sides of body 78 near the lower forwardmost extremity thereof. Protrusions 90, 92 are hollow and communicate internally of body 78 with seed passage 82. In other words, in the lower region of body 78, seed passage 82 splits into two branches within the two protrusions 90, 92 so as to direct seeds laterally outwardly and then rearwardly at the level of protrusions 90, 92. Each of the protrusions 90, 92 has a generally upright, rear face 94 within which is disposed a rearwardly facing seed outlet 96 communicating with seed passage 82. Both seed outlets 96 are disposed laterally outboard of opposite sides 46 of shank 24 such that seeds emanating from outlets 96 do so at a point laterally outboard of fertilizer trench 24*a*. Seed outlets 96 are disposed at a slightly higher elevation that the shelf-forming forward wing edges 72 such that seeds emanating from seed outlets 96 are deposited on seed shelves 60*a* and 62*a* as illustrated in FIG. 11*a*.

Figure 10:
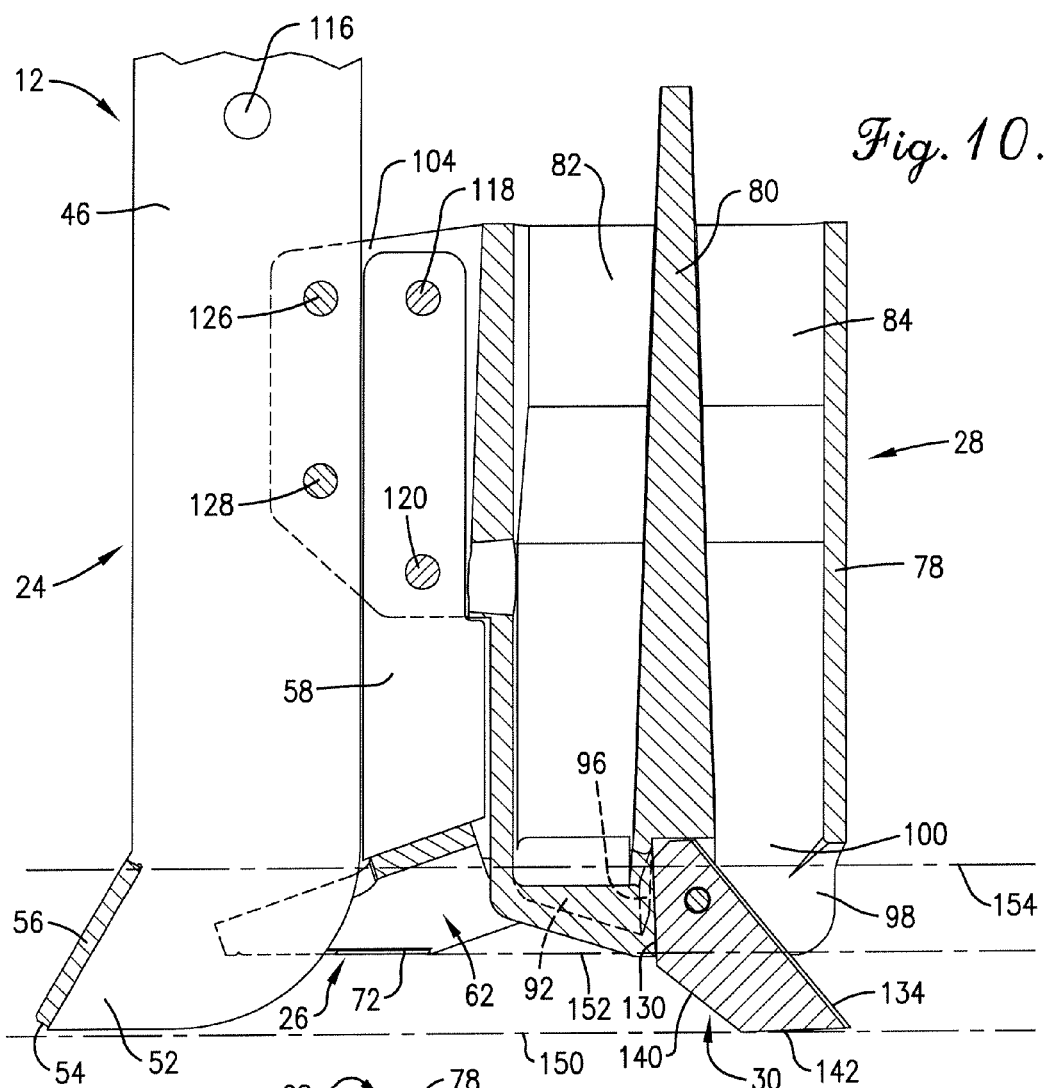
FIG. 10 is a fragmentary vertical cross sectional view through the placement unit taken substantially along line 10-10 of FIG. 9 and showing in phantom the different cut lines of the primary working components of the placement unit they move through the soil.

Body 78 of boot 28 has a centrally disposed notch 98 at its lower rear extremity that opens to the rear and bottom of body 78. Notch 98 is disposed rearwardly of seed outlets 96, having its forward termination at a point just behind seed passage 82 as illustrated in FIG. 10. Along its top extremity, notch 98 intersects with fertilizer passage 84 so as to define a fertilizer outlet 100 that opens into notch 98 from above. As will be seen, during field operations fertilizer drops through outlet 100 and onto guide member 30 which guides it out of notch 98 and down into fertilizer trench 24*a*. In effect, the rear extremity of notch 98 becomes the fertilizer outlet for boot 28 when guide member 30 is in place, which is the most preferred construction for placement unit 12.

Boot 28 has a pair of laterally spaced apart, left and right mounting flanges 102 and 104 respectively that project forwardly from body 78 in the front top half thereof. As illustrated in FIG. 7, mounting flanges 102, 104 are provided with four bolt holes 106, 108, 110 and 112 for use in attaching seed shovel 26 to boot 28 and the resulting shovel/boot subassembly to shank 24. In this respect, mounting member 58 of seed shovel 26 has a pair of bolt holes 114 and 116 that are disposed to align with bolt holes 106 and 112 respectively when seed shovel 26 is attached to boot 28. A pair of carriage bolts 118 and 120 pass through aligned bolt holes 106, 114 and 112, 116 respectively to detachably secure seed shovel 26 to boot 28. A pair of bolt holes 122 and 124 in shank 24 are disposed for alignment with bolt holes 108 and 100 respectively in flanges 102 and 104 when seed shovel 26 and boot 28 are attached to shank 24, there being an additional pair of carriage bolts 126 and 128 that pass through aligned holes 108, 122 and 110, 124 respectively for completing the attachment of the shovel/boot subassembly to shank 24.

Fertilizer guide member 30 (detailed in FIGS. 12-17) comprises a generally wedge-shaped block of material that somewhat resembles a tail projecting downwardly and rearwardly from boot 28. It is inserted up into notch 98 and is retained at that location by a transverse mounting bolt 130 passing through a transverse bolt hole 132 in guide member 30.

Guide member 30 has a downwardly and rearwardly inclined, rearwardly facing guide surface 134 that is adapted to receive fertilizer discharging from outlet 100 of fertilizer passage 84 and direct it downwardly into the bottom of fertilizer trench 24*a*. Preferably, guide surface 134 is transversely concave to assist in confining and directing the fertilizer as it travels down guide member 30 and into trench 24*a*.

Guide member 30 also has a pair of opposite left and right sides 136 and 138 respectively that converge forwardly to a fowardly facing, beveled front edge 140 spaced forwardly from rear guide surface 134. Beveled front edge 140 is inclined downwardly and rearwardly, converging slightly toward guide surface 134 as the lower end of member 30 is approached.

Guide member 30 also has a flat bottom surface 142 that is adapted to move along the bottom of fertilizer trench 24*a* in engagement therewith. Bottom surface 142 extends between and interconnects the lower termination of beveled front edge 140 and the lower termination of rear guide surface 134. Member 30 also has an upright front surface 144 at the upper termination of beveled front edge 140, as well as an uppermost flat, horizontal top surface 146 at the upper termination of guide surface 134. An inclined, intermediate surface 148 interconnects front surface 144 and top surface 146. This configuration of the upper rear end of guide member 30 as defined by front surface 144, top surface 146 and inclined intermediate surface 148 helps stabilize member 30 within notch 98 as such surfaces abut corresponding surfaces along the front and top extremities of notch 98. Guide member 30 is substantially the same width as shank 24.

When seed boot 28 is attached to shank 24, and seed shovel 26 is captured between shank 24 and boot 28, bottom surface 50 of shank 24 and bottom surface 142 of fertilizer guide member 30 are disposed at substantially the same level. This is represented by cut line 150 in FIG. 10, which also represents the bottom of fertilizer trench 24*a*. Forward wing edges 72 are disposed above cut line 150 at cut line 152 in FIG. 10, which also represents the level at which seed shelves 60 and 62*a* are located. A third line 154 in FIG. 10 represents the ground surface and is shown also in FIGS. 2, 11 and 11*a*. Rear edge 76 of wing unit 64 is disposed slightly above the level of seed outlets 96 so that soil engaged by the upper surfaces 70 of wings 60, 62 flows up and over seed outlets 96 before returning to cover seeds placed upon shelves 60, 62*a* as hereinafter explained in more detail. Immediately behind and at the same level as seed outlets 96, boot body 78 has wall surfaces in the vicinity of bolt 130 to maintain separation between the seed stream emanating from seed outlets 96 and the fertilizer emanating from fertilizer outlet 100 within notch 98.

Operation

As the seed/fertilizer placement unit 12 travels forwardly during seeding and fertilizer applications, the unit is disposed down below the surface of the soil 154 to the extent illustrated in FIG. 2. Although such operating depth may be adjusted to suit operator preference, an approximate depth as illustrated in the drawings is desirable such that most, if not all, of wing unit 64 of seed shovel 26 is disposed below the ground surface. Thus, as placement unit 12 is moves forwardly, shank 24 opens the fertilizer trench 24*a* to the depth indicated by cut line 150, while the forward edges 72 of wings 60, 62 cut shelves 60*a* and 62*a* in the soil along cut line 152. Shelves 60*a*, 62*a* are disposed on left and right sides of fertilizer trench 24*a* as illustrated in FIG. 11*a* and are spaced above the bottom of fertilizer trench 24*a* by the vertical distance between shank tip 54 and wing edges 72.

As wing edges 72 cut shelves 60*a*, 62*a* in the soil, top surfaces 70 of wings 60, 62 lift and slightly laterally deflect soil off shelves 60*a*, 62*a*. This wave of lifted soil is maintained off the newly prepared shelves 60*a*, 62*a* until such time as seed outlets 96 have passed by, thereby providing ample opportunity for seeds emanating from outlets 96 to come to rest upon shelves 60*a*, 62*a* without interference from the lifted soil. Protrusions 90, 92 cooperate with wings 60, 62 in maintaining the soil lifted off shelves 60*a*, 62*a* at this critical time. Seeds which have become deposited on shelves 60*a*, 62*a* are denoted in FIG. 11*a* by the numerals 156 and 158.

As seeds 156 and 158 are deposited on shelves 60*a*, 62*a*, they are blocked by sidewall structure of boot body 78 in the vicinity of bolt 130 from bouncing into fertilizer trench 24*a*. Thus, seeds 156 and 158 are kept from co-mingling with fertilizer being placed within fertilizer trench 24*a* to prevent damage to the seeds. The fact that seed outlets 96 are spaced considerably laterally outwardly from the fore-and-aft center line of placement unit 12 and seed trench 24a is also helpful in this regard.

As fertilizer guide 30 travels forwardly within trench 24a prepared by shank 24, its front edge 140 pushes through any loose soil in trench 24a and moves it aside until after the lower rearmost extremity of guide member 30 has passed. Thus, guide member 30 maintains the integrity of the trench prepared by shank 24 and affords an unobstructed path to the bottom of trench 24a for fertilizer emanating from fertilizer outlet 100 and traveling down rear guide surface 134 of guide member 130. This helps assure that fertilizer denoted by the numeral 160 in FIG. 11a is deposited at the very bottom of trench 24a, remote from seeds 156 and 158. Guide member 30 thus serves the dual purposes of both maintaining the integrity of fertilizer trench 24a and guiding fertilizer down into the bottom thereof at a safe location from seeds 156 and 158.

It will be seen, therefore, that the present invention permits seed and fertilizer placements like that of FIG. 11a to be consistently achieved. This relationship between seed and fertilizer provides the separation necessary to protect the seeds from the fertilizer, while at the same time keeping the nutrients provided by the fertilizer close enough to emerging plants to be usable by those plant during growth. Moreover, the shelves 60a, 62a provide a firm seed bed on which the seeds may germinate.

It will be noted that fertilizer guide member 30 does not have to cut a new trench in the ground, which would otherwise increase the ground penetration force required and cause unnecessarily heavy upward loads on the shank. Moreover, because it is merely cleaning loose dirt from the trench already cut by shank 24, guide member 30 does not break undisturbed ground which could otherwise cause the seed bed to be shattered and compromised on shelves 60a, 62a.

Guide member 30 also helps eliminate the plugging of fertilizer outlet 100 by mud which might otherwise tend to curl up into fertilizer passage 84. The free flow of fertilizer through passage 84 and outlet 100 is thus assured, due in part to the presence of guide member 30 which occupies space immediately below and to the rear of fertilizer outlet 100. Also, because fertilizer outlet 100 is located behind wings 60, 62, there is no tendency for the wings to push accumulating mud up into the fertilizer tube, a common occurrence in many conventional double shoot systems. The rearward facing orientation of seed outlets 96 helps avoid plugging of those structures, while the rearwardly opening orientation of notch 98 associated with fertilizer outlet 100 helps prevent plugging by mud and plant material at that location as well. Having directly downward opening outlets for the seed and fertilizer would be more likely to cause plugging problems.

The bolted-together nature of seed/fertilizer placement unit 12 allows the end user to only replace individual components that are worn out, rather than replacing the entire assembly. However, it will be appreciated that the four major components of placement unit 12, i.e., shank 24, seed shovel 26, boot 28 and guide member 30 could all be manufactured as a single unitary structure without departing from the principles of the present invention. All of such major components are preferably constructed from a strong, wear-resistant metal or other wear-resistant material and may be provided with additional wear-resistant portions such as illustrated by the wear strip 56 on shank 24 and the forward edges 72 on wings 60, 62. Of course, the hardened wear edges could be constructed of a suitable wear-resistant material other than metal.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. Seed and fertilizer placement apparatus comprising:

an upright shank having a leading edge, a pair of opposite sides, and a tip at the lower end of the leading edge for making a fertilizer trench in the ground as the shank is moved forwardly with the tip disposed below the surface of the ground;

a seed shovel disposed behind said leading edge and including at least one wing projecting laterally outwardly beyond a corresponding side of the shank, said at least one wing having a forward, laterally outwardly extending edge disposed to make a generally horizontal seed shelf below the surface of the ground that extends laterally outwardly from the trench as the apparatus is moved forwardly with the tip and shovel disposed below the surface of the ground, said forward edge of the at least one wing being disposed above the tip of the shank such that the seed shelf formed by the wing is above the bottom of the fertilizer trench;

a seed outlet disposed behind said forward edge of the at least one wing and laterally outboard of said corresponding side of the shank in position for discharging seeds onto the shelf formed by the at least one wing;

a fertilizer outlet disposed behind said seed outlet and in fore-and-aft alignment with said leading edge of the shank for discharging fertilizer into the trench; and a fertilizer guide member behind said seed outlet and including a rearwardly facing, rear guide surface disposed to receive fertilizer discharging from said fertilizer outlet and direct the fertilizer into the trench, said guide member projecting downwardly below said forward edge of the at least one wing and terminating at substantially the same level as said tip of the shank, said seed and fertilizer outlets comprising separate parts of a common body, said body having an internal seed passage communicating with said seed outlet and a separate internal fertilizer passage communicating with said fertilizer outlet, said body having a lowermost bottom extremity spaced above the level of said tip of the shank, a pair of opposite sidewalls extending downwardly to said bottom extremity, and a rear wall interconnecting the sidewalls, said body having a notch that is open along a rearmost portion of said bottom extremity of the body and a lowermost portion of said rear wall of the body, said notch being disposed between lowermost portions of said sidewalls and intersecting with said internal fertilizer passage to present said fertilizer outlet, said fertilizer guide member having an upper end received within said notch and a lower end projecting downwardly out of the notch beyond the bottom extremity of the body to prevent soil from plugging the fertilizer outlet during operation.

2. Seed and fertilizer placement apparatus as claimed in claim 1, said guide surface of the fertilizer guide member being downwardly and rearwardly inclined.

3. Seed and fertilizer placement apparatus as claimed in claim 2, said guide surface being transversely concave.

4. Seed and fertilizer placement apparatus as claimed in claim 1, said guide member having a width that substantially corresponds to the width of said shank in the vicinity of said tip.

5. Seed and fertilizer placement apparatus as claimed in claim 1, said guide member having a forwardly facing, beveled front edge spaced forwardly from said rear guide surface for moving through the trench ahead of the point of delivery of fertilizer into the trench.

6. Seed and fertilizer placement apparatus as claimed in claim 5, said beveled front edge of the guide member being inclined downwardly and rearwardly.

7. Seed and fertilizer placement apparatus as claimed in claim 6, said guide member having a generally flat, horizontally extending bottom surface extending between the lower termination of the front edge and the lower termination of said rear guide surface.

8. Seed and fertilizer placement apparatus as claimed in claim 7, said seed shovel including an upright mounting member rigidly fixed to and projecting upwardly from said at least one wing, said mounting member being detachably secured to said body forwardly of the body.

9. Seed and fertilizer placement apparatus as claimed in claim 8, said body being detachably secured to said shank, said mounting member of the seed shovel being disposed between the shank and said body.

10. Seed and fertilizer placement apparatus as claimed in claim 9, said seed shovel having a pair of said at least one wings projecting laterally outwardly from opposite sides of said mounting member, said shovel having a rearwardly extending notch in a front portion thereof, said shank being received within said notch such that said at least one wings partially embrace the shank on opposite sides thereof.

11. Seed and fertilizer placement apparatus as claimed in claim 1, said forward edge of the at least one wing being angled rearwardly.

* * * * *